Jan. 17, 1928.
A. R. PRIBIL
PISTON
Filed Feb. 23, 1926
1,656,293
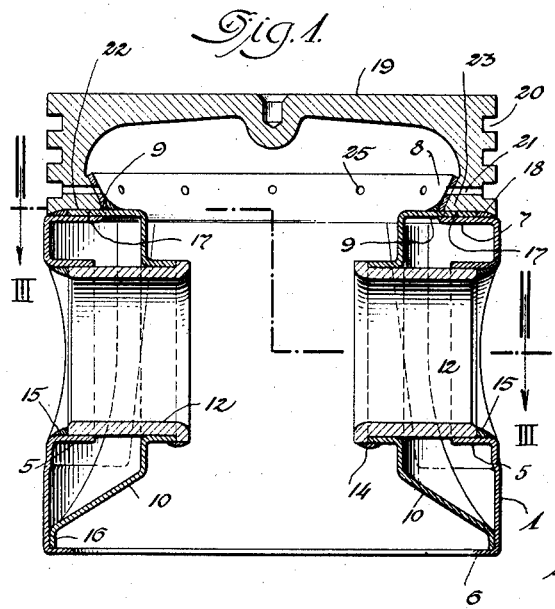
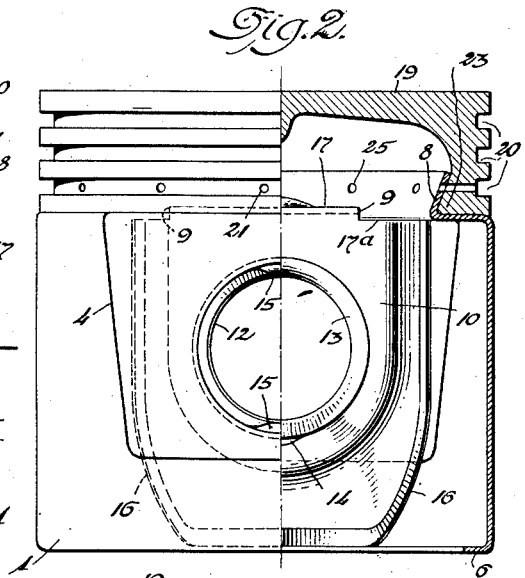
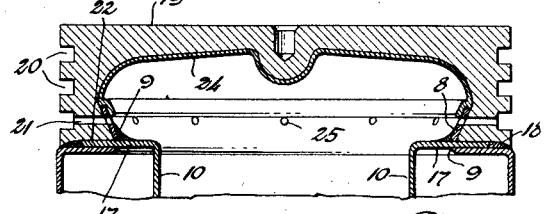
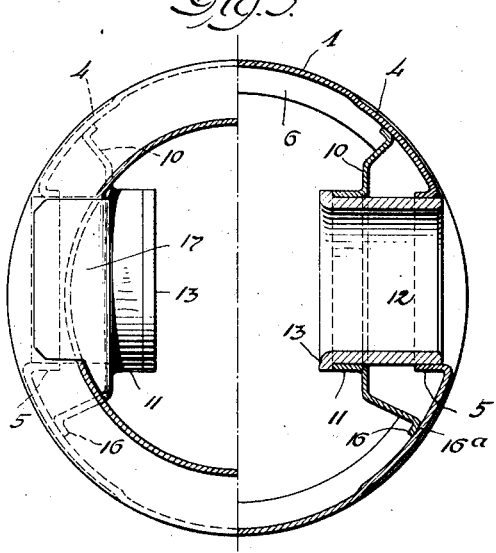
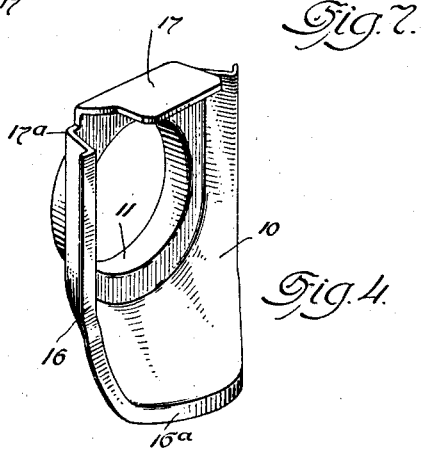
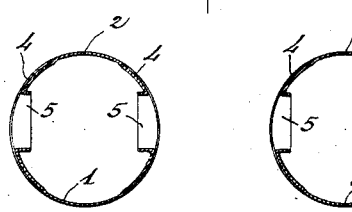
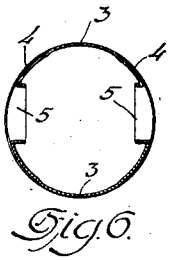
Inventor:
Alexis R. Pribil
Attorneys.

Patented Jan. 17, 1928.

1,656,293

UNITED STATES PATENT OFFICE.

ALEXIS R. PRIBIL, OF SAGINAW, MICHIGAN.

PISTON.

Application filed February 23, 1926. Serial No. 90,009.

This invention relates to pistons and has special reference to that class of pistons wherein a head is provided with a skirt and the head and skirt made of different metals with a co-efficient of expansion approaching each other to afford a uniform structure under all operating conditions.

My piston has been especially designed for the cylinders of internal combustion engines and the piston may be characterized in the following particulars.

First, there is a pressed sheet metal skirt that may be made of one piece of material bent to provide a cylindrical structure, with its edges welded or otherwise connected, or the skirt may be made of two opposed semicylindrical parts placed in abutting or overlapped relation and welded or otherwise connected to form a cylindrical structure.

Second, novel pin supporting means is mounted in the pressed sheet metal skirt and connected thereto so as to increase the rigidity of the skirt and afford a substantial bearing connection for a connecting rod.

Third, the head of the piston and the outer end of the skirt have tapered projections by which a skirt may be positively anchored within the head, and provision is made for the return of a lubricant from piston ring grooves or cylinder walls to the interior of the piston.

My invention involves a method of manufacturing the article outlined above and the method may consist of producing the skirt body in one or more pieces; pressing or otherwise forming the outer end of the skirt body to provide an anchoring flange; punching or otherwise treating opposed walls of the skirt body to provide bushing holding sleeves; flanging the inner end of the skirt body; slotting the anchoring flange at the outer end of the skirt body; mounting piston pin holders in the skirt; mounting a head on the skirt, and then securing the head in place by virtue of the anchoring flange of the skirt, it being understood that all parts of the piston are welded where the parts join one another.

The method may involve casting a head on the skirt in which instance a sheet metal member may be associated with the anchoring flange of the skirt as a substitute for a sand core. In casting or otherwise providing the sheet metal skirt with a head, of different material than the skirt, my invention aims to provide a piston that will withstand the intense heat to which it is subjected in the cylinder of an internal combustion engine, and it is by virtue of the sheet metal skirt that the weight of the piston is comparatively reduced, the use materially increased by rapidly disseminating heat, and in the end a cheaper and more durable piston obtained.

My invention will be hereinafter described and then claimed and reference will now be had to the drawing, wherein Figure 1 is a longitudinal sectional view of the piston;

Fig. 2 is a side elevation of the same partly in section;

Fig. 3 is a cross sectional view of the pistons taken on the line III—III of Fig. 1;

Fig. 4 is a perspective view of the detached pin holder;

Fig. 5 is a cross sectional view of a skirt made of one piece shell;

Fig. 6 is a similar view of a skirt made of shell halves; and

Fig. 7 is a longitudinal sectional view of a portion of the piston showing the use of a mold member.

In the drawings, the reference numeral 1 denotes a pressed sheet metal skirt of cylindrical form and as shown in Fig. 5, the skirt may be made of a single piece of metal brought to cylindrical form with its edges abutting or overlapped, as at 2, and suitably connected together, for instance by welding. Then again, the skirt may be made of semi-cylindrical halves, as shown in Fig. 6, and the halves welded or otherwise connected together, as at 3. In either instance, the skirt affords a rigid piston body or shell and diametrically opposed walls thereof are inset, as at 4, to form lubricant recesses and these inset walls are punched and pressed to provide opposed inwardly extending bushing holding sleeves 5.

The inner end of the piston body 1 is provided with an inturned annular flange 6 and the outer end of the piston body is formed with an inturned annular shoulder 7 terminating in an annular upstanding flange 8 which is used for head anchoring purposes. At the juncture of the flange 8 with the shoulder 7 there are wide opposed slots 9 for a purpose that will hereinafter appear.

Mounted in the piston body are pressed sheet metal holders 10 having bushing sleeves 11 adapted to aline with the bushing sleeves 5 of the body 1 so that bushings 12 may be mounted in the sleeves to receive the usual connecting rod pin (not shown). The bushings 12 have the inner ends thereof flanged, as at 13, to bear against the sleeves 11 and the inner ends of said bushings may be spot welded or otherwise secured, as at 14, while the outer ends thereof may be welded or otherwise secured, as at 15, in the body sleeves 5. The pin bushings 12 assist in connecting the holders 10 to the piston body and said holders have side flanged edges 16; end flanges 16ª, and end edges 17ª, all of which are welded or otherwise connected to the inner wall of the piston body. The end flanges 16ª bear on the inturned flange 6 of the body or shell and the end edges 17ª bear against the shoulder 7, so that said holders constitute longitudinal braces for the inner walls of the piston body or shell. In addition to such securing means for the holders, there are inwardly projecting lateral tongues 17 which extend into the slots 9 onto the shoulders 7 and are welded or otherwise connected to said shoulders, as at 18. The tongues 17 snugly fit the slots 9 and in consequence of this manner of securing the holders to the piston body there is a rigid fabricated bearing for a connecting rod pin within the piston. By reference to Fig. 1 it will be noted that the holders 10 are seated on the inturned flange 6 of the piston body 1 and it is by virtue of such seating of the inner ends of the holders, the outer end edges and the tongues 17 at the outer ends of the holders that said holders are firmly braced relative to the piston body.

The reference numeral 19 denotes a cast head, preferably made of aluminum and this head has the usual annular exterior ring receiving grooves 20 with the inner wall of the innermost groove provided with a plurality of radially disposed ports 21 so that any lubricating oil may pass inwardly into the head and piston body. The head 19 is substantially hollow and is formed with diametrically opposed pockets 22 to receive the tongues 17. It is also formed with an annular inclined shoulder 23 against which the anchoring flange 8 of the piston is secured to lock the piston body and head together. The inclination of the annular shoulder 23 is towards the inner end of the body 1 so that there is somewhat of a dovetail connection between the head and body that will preclude any accidental displacement. The head 19 bears on the shoulder 7 and the tongues 17, and in practice the head is preferably molded on to the piston body or skirt. There may be other ways of anchoring the head relative to the piston body or skirt, for instance, by pressing the flange 8 outwardly on to the shoulder 23 and welding it in position. I prefer to cast the aluminum head about the flange 8 and on the piston body and to facilitate this operation, obviate the necessity of using a sand core, and permit of the head 19 being die cast, I mount a sheet metal mold member 24 on the edges of the flange 8, as best shown in Fig. 7. This mold member may be seated against the inner wall of the flange 8, without necessarily resting on the edge thereof and it may become a fixture within the complete piston.

The flange 8 is apertured, as at 25 with the apertures arranged to register with the ports 21 so that lubricant may pass into the head or piston body. This flange may be welded or otherwise secured to the tongues 17, and it is in this connection that welding may be used throughout the entire piston structure to insure practically a homogeneous mass possessing practically the same rigidity as though the sheet metal piston body or skirt were integral with the aluminum head. The advantages of the aluminum head have been realized in the piston industry and from a manufacturing standpoint there are many advantages gained in substituting pressed sheet metal parts for cast parts. It is in view of all these advantages that I have designed my piston and as set forth in the beginning a method is involved in the manufacture of the piston.

While in the drawings there are illustrated the preferred embodiment of my invention, it is to be understood that the structural elements are susceptible to such variations and modifications as fall within the scope of the appended claims.

What I claim is:—

1. A piston including a head and a body attached thereto, said head having an interior body supporting shoulder, said body being formed of pressed sheet metal having an inturned flanged end seated on the body supporting shoulder of said head, and pin supporting means in said body, said body being slotted to receive portions of said pin supporting means.

2. A piston including a head, a body attached to said head, said body and head having contacting shoulders, a flange on said body extending into said head so as to provide a dovetail connection between said body and head, and pin supporting means in said body with portions thereof extending between the shoulders of said head and body.

3. A piston including a hollow head and a sheet metal body attached thereto, an annular flange on the outer end of said body extending into said hollow head for attaching said body to said head, and pin supporting means in said body having portions thereof extending between said body and said head.

4. A piston as called for in claim 3, wherein said body has end flanges with said pin supporting means engaging said end flanges.

5. A piston comprising a hollow aluminum head having an interior shoulder, a pressed sheet metal body abutting said head, an annular flange carried by the outer end of said body and extending into said head and secured to the shoulder thereof, and pin supporting means in said body having tongues extending through the body flange and between said body and head.

6. In a piston having a head and a sheet metal body connected thereto, a pin supporting means in said body, said means comprising holders welded to said body and provided with tongues extending between said body and said head.

7. A piston comprising a sheet metal body having an outturned annular flange, a mold member supported by said flange, and an aluminum head cast on said mold member and said body flange.

8. A piston as called for in claim 7, and pin holders in said body provided with tongues sandwiched between said body and said head.

In testimony whereof I affix my signature.

ALEXIS R. PRIBIL.